(12) United States Patent
Kawai et al.

(10) Patent No.: US 6,793,458 B2
(45) Date of Patent: Sep. 21, 2004

(54) TURBINE FRAME, TURBINE ASSEMBLING METHOD AND TURBINE ASSEMBLING AND TRANSPORTING METHOD

(75) Inventors: Chikahiro Kawai, Kanagawa-ken (JP); Mitsuo Takahashi, Kanagawa-ken (JP); Makoto Kakizaki, Kanagawa-ken (JP); Kenzo Matsuyama, Kanagawa-ken (JP); Katsuhide Hiyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/163,092

(22) Filed: Jun. 6, 2002

(65) Prior Publication Data

US 2002/0197147 A1 Dec. 26, 2002

(30) Foreign Application Priority Data

Jun. 8, 2001 (JP) .................................... 2001-174448

(51) Int. Cl.$^7$ .............................................. F01D 25/28
(52) U.S. Cl. ..................................... 415/213.1; 248/671
(58) Field of Search ...................... 415/213.1; 248/671, 248/637, 657; 29/889.2

(56) References Cited

U.S. PATENT DOCUMENTS 4,804,162 A * 2/1989 Rice ........................... 248/671

FOREIGN PATENT DOCUMENTS

| JP | 62-267505 A | 11/1987 |
| JP | 5-149107 A | 6/1993 |
| JP | 7-102906 A | 4/1995 |

* cited by examiner

Primary Examiner—Edward K. Look
Assistant Examiner—Dwayne J White
(74) Attorney, Agent, or Firm—Foley & Lardner LLP (57) ABSTRACT

A turbine frame having a casing supporter supporting a casing of a turbine, a casing height adjuster adjusting a height of the casing supporter, a rotor supporter supporting a rotor of the turbine, a rotor position adjuster adjusting a supporting position of the rotor supporter, thereby the casing height adjuster and the rotor position adjuster control the alignment of the turbine components in assembling the turbine.

12 Claims, 10 Drawing Sheets

TURBINE FRAME, TURBINE ASSEMBLING METHOD AND TURBINE ASSEMBLING AND TRANSPORTING METHOD

CROSS-REFERENCE TO RELATED APPLICATIONS

This application is based upon and claims the benefit of priority from the prior Japanese Patent Application No. 2001-174448 filed on Jun. 8, 2001, the entire contents of which are incorporated herein by reference.

BACKGROUND OF THE INVENTION

1. Field of the Invention

The present invention relates to a turbine assembling and transporting frame capable of assembling a turbine on a frame and transporting the turbine as it is and a turbine assembling method and a turbine transporting method using the frame, particularly to a turbine assembling and transporting frame preferable for assembling and transporting a high pressure turbine, a high and intermediate pressure integral turbine or the like of a steam turbine and a turbine assembling method and a turbine transporting method using the frame.

2. Description of the Related Art

In recent years, in order to easily install a power generating equipment mainly of a small-sized class or an intermediate-sized class at a site of a destination of export or the like, there has been frequently adopted integral transporting and assembling for previously assembling a turbine in a factory and delivering the turbine in a completely assembled state substantially finished with confirmation and adjustment of clearances between a stationary portion and a rotary portion. For example, it is disclosed in Japanese Non-examined Patent Publications No. 7-102906, No. 5-149107 and No. 62-267505.

Figure 7:
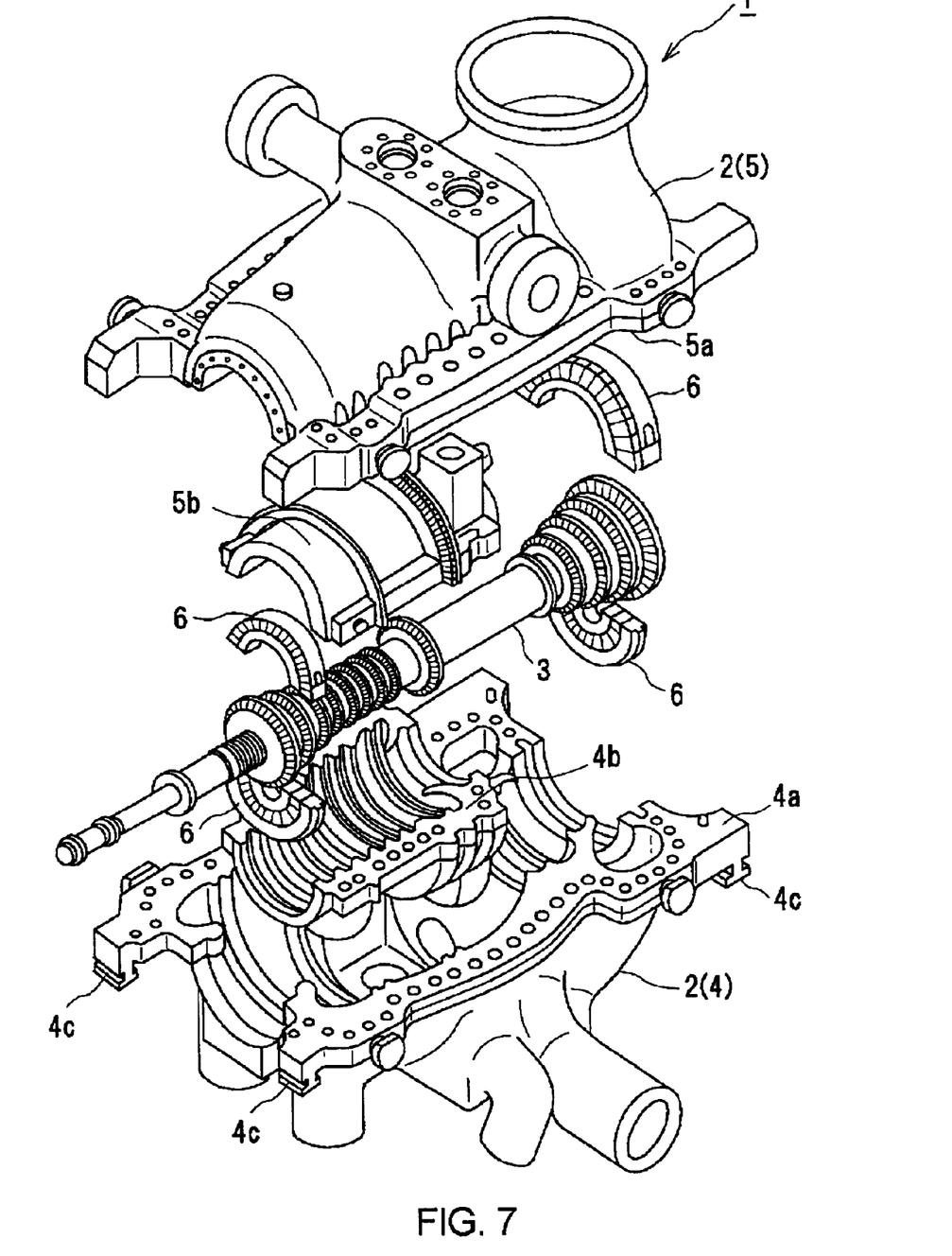
FIG. 7 is a disassembled perspective view exemplifying a constitution of a turbine constituting an object of applying the invention.

First, an explanation will be given of an outline of a constitution of a turbine constituting an object of applying the conventional technology and this invention. A turbine 1 exemplified in FIG. 7 is a high and intermediate pressure integral turbine of a steam turbine and is composed of a casing 2 constituting a stationary portion and a rotor 3 constituting a rotary portion in gross classification. The casing 2 is constituted by upper and lower divided members, that is, a casing lower half portion 4 and a casing upper half portion 5. Similarly, the casing lower half portion 4 is constituted by an outer casing lower half portion 4a and an inner casing lower half portion 4b assembled inside of the outer casing portion 4a, and the casing upper half portion 5 is constituted by an outer casing upper half portion 5a and an inner casing upper half portion 5b assembled inside of the outer casing upper half portion 5a. The inner casing lower half portion 4b and the inner casing upper half portion 5b are respectively assembled with nozzles 6 each having an upper and lower divided portion constituting a stationary part for regulating and guiding flow of steam to the rotor 3.

Figure 8:
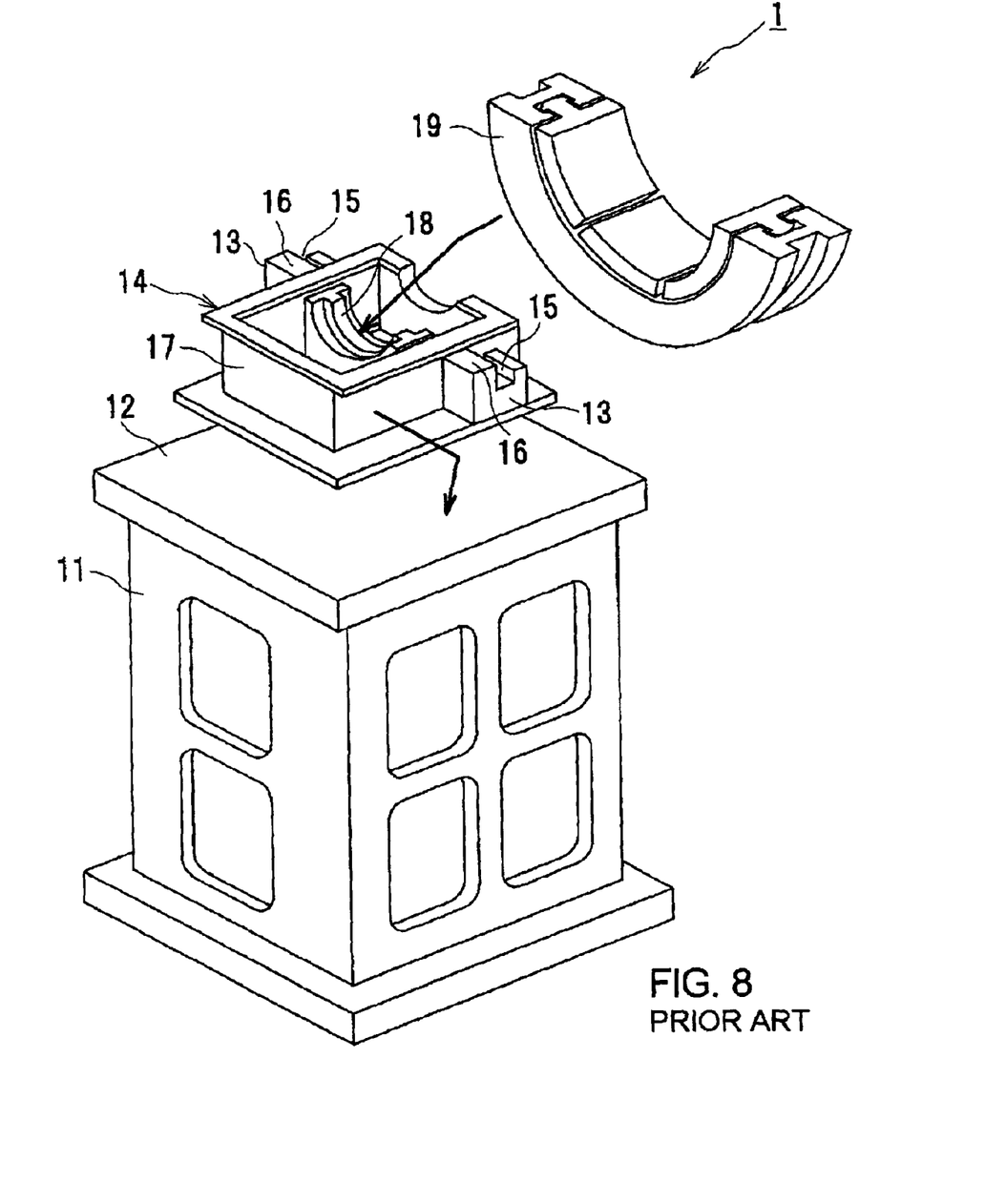
FIG. 8 is a perspective view showing a conventional frame for assembling.

Next, an explanation will be given of the conventional technology with regard to assembling and transporting the turbine 1 in reference to FIG. 8 through FIG. 10. FIG. 8 is a perspective view showing a constitution of a conventional turbine assembling equipment, and FIG. 9 is a sectional view showing to enlarge a portion the equipment of FIG. 8.

As shown in FIG. 7 and FIG. 8, in assembling the turbine 1, conventionally, there has been frequently used a base level block 11 constituting an article of a factory facility as a frame for assembling and supporting the turbine 1. The base level block 11 is in a shape of a large-sized block, for example, a box-like shape, and an upper face of the base level block is made as a horizontal receive face 12, and at least one pair of the base level block 11 are arranged at positions of two ends of the casing 2 in a turbine shaft direction. In FIG. 8, only one of the pair of base level blocks 11 is shown. Each bearing standard 14 is installed to the basic level block 11, and thus the assembling of the turbine is performed. Each bearing standard 14 has a pair of casing support bases 13 separately arranged for supporting the casing 2 and half-ring-like receive member 18 on which a bearing 19 for supporting a rotating rotor is placed, as main components, and the whole composes a welding structure. Thus, the bearing standard 14 has a function of supporting the casing and a function of supporting the rotor.

Each pair of casing support bases 13 supports the casing 2 to be assembled at two portions of the casing 2 interposing the rotor 3 at the positions of the respective end portions in the turbine shaft direction. Each casing supporting base 13 is constituted by, for example, in a shape of a parallelepiped block, having a fitting groove 15 an upper face of which is opened on one side of the supporting base 13 and a horizontal receive portion 16 with a flat upper face on the other side of the supporting base 13. Further, a projected portion 4c projected downwardly from an end portion of the casing lower half portion 4 of the turbine 1 can be inserted into and held by the fitting groove 15, and the end portion of the casing 2 after assembling can be mounted on and held by the horizontal receive portion 16 with the flat face, so that a shop assembly condition of the turbine 1 can be reproduced. Further, the bearing standard 14 has, for example, a constitution of holding a ring-like receive member 18 in a shape of a semicircular arc, an upper face of which is opened in a frame member 17 in a quadrangular shape in plane view, so that a lower half portion of a bearing 19 upwardly and downwardly divided in two can be fitted and held by this constitution. Further, in assembling, first, the casing lower half portion 4 is mounted on the casing support bases 13. In this case, the projected portions 4c at the two portions of the respective end portions of the casing lower half portion 4 in the axial direction are respectively inserted into the fitting grooves 15 of a total of four pieces of the casing support bases 13, symmetrically arranged with respect to the rotor shaft.

Figure 9:
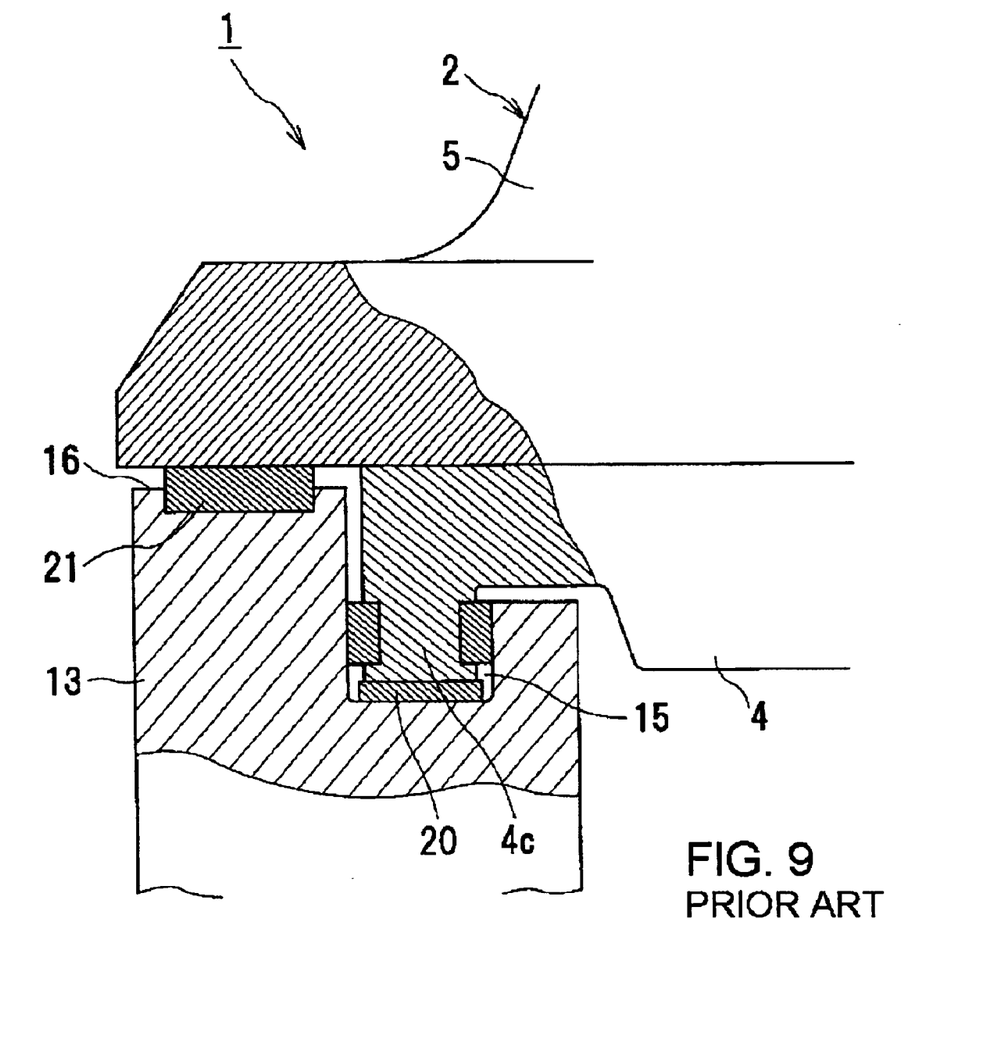
FIG. 9 is an enlarged sectional view showing a casing supporting portion of the frame shown in FIG. 8.
Figure 10:
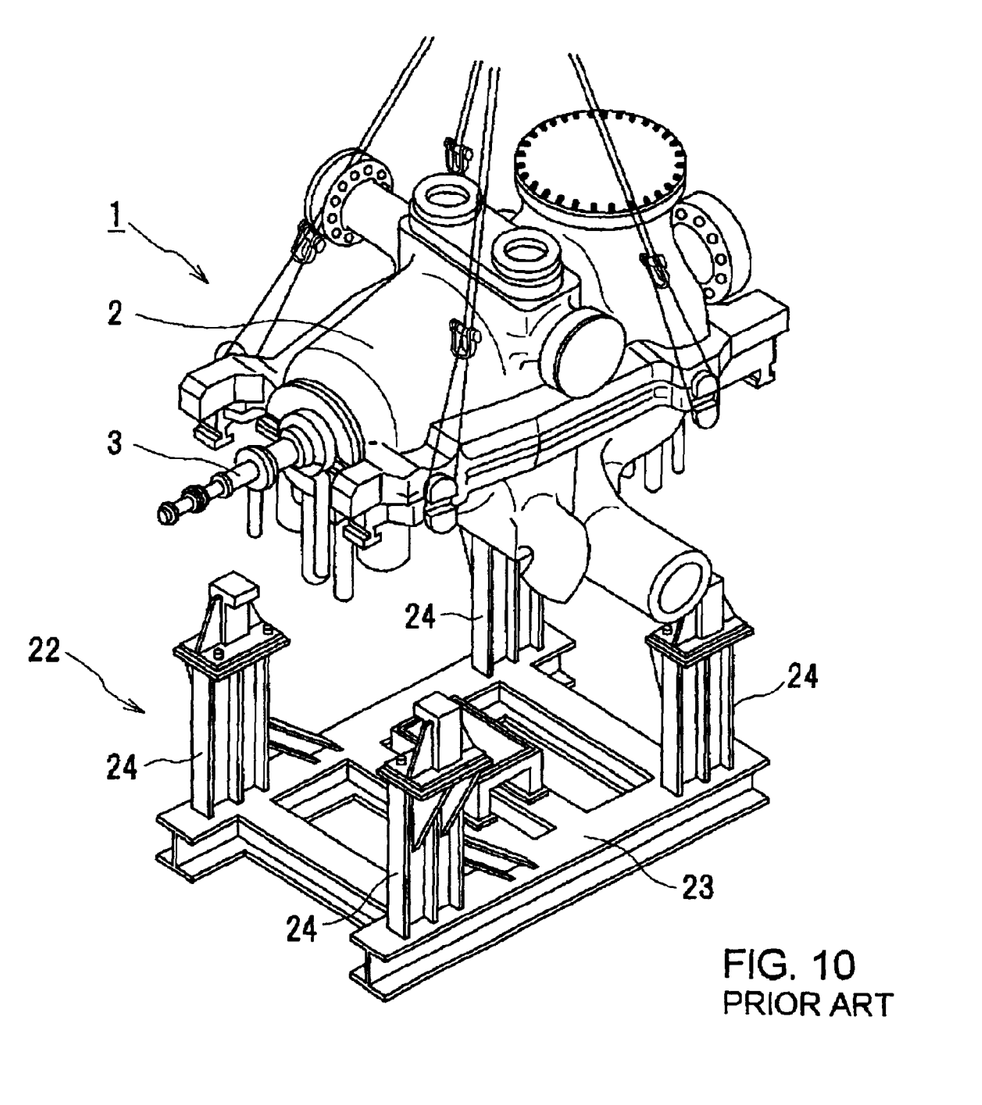
FIG. 10 is a perspective view showing a frame for transportation and a transporting method of the conventional example.

FIG. 9 shows a state of inserting a projected portion 4c into the fitting groove 15. That is, each projected portion 4c of the casing lower half portion 4 is respectively inserted into and supported by the respective fitting groove 15 of the casing support base 13 in a state of being mounted on an assembly key 20. And by adjusting a thickness of the assembly key 20, a horizontal level of the casing lower half portion 4 is accommodated and the assembly is installed by coordinating the assembly in a relative positional relationship such that uniform load is applied. Further, the installed casing lower half portion 4 is assembled with parts on the lower half side in stationary parts of the nozzles 6 and the like upwardly and downwardly divided in two.

Thereafter, the bearing 19 shown in FIG. 8 is supported by the bearing standard 14, the rotor 3 is contained in the bearing 19, clearances are measured, clearance values are made to be proper by adjusting positions of the stationary parts and the rotor 3, and parts on the upper half side are assembled. Thereby, the rotor 3 can be held rotatably in a state of assembling the bearing 19 to the bearing standard 14. Hence, finally, the casing upper half portion 5 is assembled to the casing lower half portion 4, which are fastened by bolts to thereby finish assembling and the turbine 1 is completed. At this occasion, the casing lower half portion 4 is supported by the casing upper half portion 5 and, therefore, a running key 21 is inserted between the casing 2 and the receive portion 16 of the casing support base 13 and the previously inserted assembly key 20 is detached, so that the casing 2 is supported by the running key 21. In this way, the casing 2 constituting the stationary portion and the rotor 3 constituting the rotary portion are assembled by corresponding support structures, respectively.

Further, at a site of installing the turbine such as a power station, the bearing standard 14 is installed to a concrete foundation or the like. Hence, the above-described assembled bearing 19 is detached from the rotor 3 and the rotor 3 is brought into a state of being held in the casing 2. The detached bearing 19 is delivered separately from the assembled casing 2. In this case, as a substitute for releasing support by the bearing 19, the rotor 3 is fixed to the casing 2 by a rotor receive member for temporarily receiving. That is, the rotor receive member constituting a fixing device for temporarily receiving the rotor 3 is assembled to a packing casing provided at an end portion of the casing 2; thereby, the rotor 3 is fixed in transportation. This packing casing is a portion for holding a gland packing and, in place of the gland packing, the rotor receive member having a same shape as that of the gland packing is assembled; thereby, the rotor 3 is supported from a diameter direction, and in order to prevent movement of the rotor 3 per se in the axial direction, the packing casing has a function of fixing the rotor 3 by a bolt inclined by a constant angle to the axial direction. Thereby, the rotor 3 is fixed to the casing 2. Then, under the state, the whole of the casing can be hung and also the rotor 3 can be hung while maintaining a positional relationship with the stationary portion.

Next, an explanation will be given of transportation of the turbine. FIG. 10 shows a frame 22 for transportation for transporting the turbine 1 after having been assembled as described above and shows a situation of mounting the turbine 1 to the frame 22 for transportation. As shown in FIG. 10, the frame 22 for transportation applied conventionally has a constitution in which stays 24 are respectively erected from respective corner portions of a base member 23 in a shape of a horizontal frame and the casing 2 can be supported by the stays 24. Further, in an integrated state in which the rotor 3 is fixed to the casing 2, by lifting the whole of the casing 2, the rotor 3 can also be hung while maintaining the positional relationship relative to the stationary portion and, as shown in FIG. 10, the hung turbine 1 is transferred to shift to the frame 22 for transportation and, in a state of having been transferred to shift in this way, the casing 2 is shipped and transported.

According to the conventional technology described above, the turbine integrally assembled on the frame for assembling is shifted to the frame for transportation and delivered. Thus it is necessary to ensure a space for shifting operation and placing the frame for transportation other than a space for assembling in the same factory. On the other hand, the frame for transportation is fabricated in a structure capable of receiving the casing and, therefore, two of the same kind of structures, that is, the frame for assembling and the frame for transportation, are needed. Further, generally, the frame for transportation is scrapped after having been used. In this way, conventionally, the space for temporarily placing the frame for transportation is necessary, further, according to a necessity for the frame for transportation to mount and transport the turbine in the assembled state, the floor area becomes larger than an outer shape of the turbine and there poses a problem that a space to a same degree as that of the space for assembling is temporarily needed.

As a result of intensive research, we have conceived that there is a subject of a dimensional accuracy of a conventional frame for integrating as a reason of constructing the frame for integrating a turbine by an exclusive constitution and fabricating and using the frame with clearly differentiating the frame for integrating from a frame for transporting the turbine. That is, although the turbine is a large-sized machine, it is necessary to deter, as much as possible, generation of vibration by bending of a rotating shaft or the like owing to high-speed rotation of a rotor of the turbine. Thus high accuracy equal to or higher than 0.05 mm per one meter is requested in accuracy of centering the rotating shaft. Further, also with regard to a dimension of a clearance between a stationary portion and a rotary portion, particularly that of a fluid seal portion or the like, in order to achieve high efficiency, it is also necessary to arrange a dimension as minutely as possible in accuracy.

Meanwhile, a turbine is extremely large-sized and is provided with a large weight and, therefore, a frame for assembling and supporting the turbine is obliged to be constructed by a large-scaled constitution with welding section steel or the like. According to a dimension of a frame for assembling constituting such a large-sized welding structure, with regard to a height, a horizontal degree or the like, an accuracy about 0.5 mm per one meter is a limit at most. Therefore, conventionally and generally, a frame exclusively for assembling a turbine is fabricated and characteristic of the frame is fully known and thereafter, with regard to centering of a casing and setting a height of supporting the casing or the like, high accuracy formation is achieved through adjusting operation such as changing a thickness of a key inserted into a casing supporting portion or the like and utilizing a shim or the like. Under such a conventional state, it is common to promote operational efficiency by using a frame exclusively for assembling. Further, in the case of integrally transporting and assembling, as described above, it is common that a turbine is shifted to a frame used exclusively for transportation after substantially whole of the turbine has been assembled.

However, we have pointed out that under such conventional situations, by a recent increase in the number of deliveries by integrally transporting and assembling, a request for simultaneously assembling a plurality of turbines is enhanced, and a problem of operability at inside of a limited factory space is frequently posed, so that if the conventional method is utilized in the future, a further problem of space utilizing performance, operability in shifting a turbine or the like is anticipated, and thus it is predicted as a subject to solve this problem.

SUMMARY OF THE INVENTION

It is an object of the invention to provide a turbine frame, a turbine assembling method and a turbine transporting method using the frame, with no need of shifting an integrated turbine when integrally transporting and assembling the turbine, capable of effectively utilizing a factory space while ensuring a sufficient accuracy necessary for assembling and capable of achieving to shorten a time period of fabrication by dispensing with a wasteful step by operation of shifting the turbine.

If a request for high dimensional accuracy with regard to a frame for assembling can pertinently be dealt with and at the same time, the problem of shifting a turbine after assembling can be resolved, it seems that an enormous practical effect can be expected in integrally transporting and assembling a turbine, such that a factory space can effectively be utilized and a work period can be shortened by reducing or omitting wasteful operation and the like. This invention has been carried out based on such a viewpoint and the above-described object is to be achieved by providing a frame used for transportation with a function suitable also for assembling, that is, adding a function of supporting a turbine casing having high accuracy and a function of supporting a rotor to the frame for transportation.

Additional purposes and advantages of the invention will be apparent to persons skilled in this field from the following description, or may be learned by practice of the invention.

According to an aspect of the invention, there is provided a turbine frame including a supporting portion configured to support turbine components during assembly of the turbine, wherein the supporting portion has portion adjusters which adjust the position of the supporting portion, and wherein the position adjusters are configured to control the alignment of the turbine components during assembly of the turbine.

According to another aspect of the invention, there is provided a method of assembling turbine components of a turbine using a turbine frame including, arranging a casing of the turbine on a first supporting portion provided in the turbine frame, arranging a rotor of the turbine on a second supporting portion provided in the turbine frame, adjusting the height of the casing by adjusting the first supporting portion, adjusting the position of the rotor by adjusting the second supporting portion at least one of the horizontal and vertical directions, and assembling the turbine components while maintaining the alignment of the turbine components.

According to still another aspect of the invention, there is provided a method of assembling turbine components of a turbine using a turbine frame including, arranging a casing of the turbine on a first supporting portion provided in the turbine frame, arranging a rotor of the turbine on a second supporting portion provided in the turbine frame, adjusting the height of the casing by adjusting the first supporting portion, adjusting the position of the rotor by adjusting the second supporting portion at least one of the horizontal and vertical directions, assembling the turbine components while maintaining the alignment of the turbine components, securing the assembled turbine to the turbine frame, and transporting the turbine frame with the turbine secured to the turbine frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE INVENTION

Referring now to the drawings, one embodiment concerning to this invention is explained as follows, by taking an example of assembling and transporting a high and intermediate pressure integrated steam turbine, in reference to FIG. 1 through FIG. 7.

Figure 1:
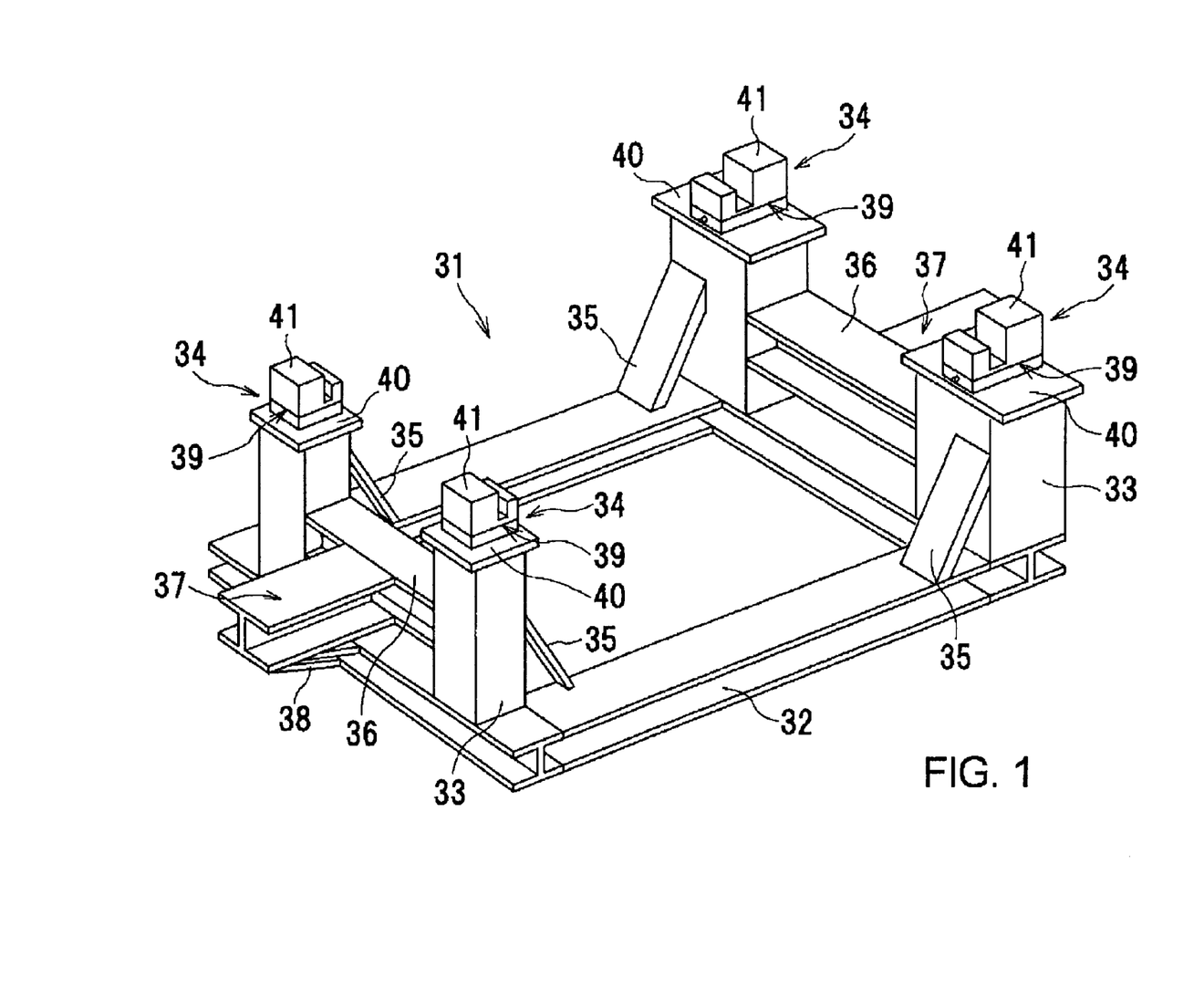
FIG. 1 is a perspective view showing a turbine assembling and transporting frame according to an embodiment of this invention.

FIG. 1 is a perspective view showing a turbine frame 31 according to this embodiment. As shown by FIG. 1, the frame 31 is constructed by a constitution having a base frame 32 in a horizontal square shape connected with, for example, "I" section steel, which is a steel component in a shape of the character I, erecting stays 33 in a box pillar shape at respective corner portions of the base frame 32 and provided with casing supporting portions 34 above the stays 33. Among the respective stays 33, two pieces of the stays 33 on a side of an intermediate pressure turbine having a relatively large weight, which is a right side of FIG. 1, are provided with sections larger than those of two pieces of the stay 33 of a side of a high pressure turbine, which is a left side of FIG. 1. And each respective stay 33 is provided with a reinforcement rib 35 respectively.

Between a pair of the stays 33 on the side of the high pressure turbine and between a pair of the stays 33 on the intermediate pressure side opposed to each other, there are respectively hung horizontal beams 36 each comprising, for example, I section steel, and there are projected horizontal rotor supporting portions 37 from outer side faces substantially at central positions of the respective beams 36 along a direction orthogonal thereto, that is, along a direction of a rotor shaft to be mounted. Further, also the rotor supporting portions 37 are composed of, for example, I section steel, lower portions of which are supported by reinforcement ribs 38, respectively, provided at the base frame 32. The base frame 31 having the above-described constitution is constructed by a welding-bond structure with large-sized section steel and therefore, as described above, a dimensional accuracy of the frame 31 is about 0.5 mm per one meter, which is not necessarily high.

In such a constitution, according to this embodiment, each of the casing supporting portion 34 provided at the respective stay 33 has a constitution with a height adjuster 39 having a function capable of adjusting a very small dimension. That is, a flat flange portion 40 is provided at an upper end portion of the respective stay 33 and a supporting member 41 in a block-like shape having two supporting portions is mounted above the flange portion 40 to be capable of adjusting a height by a jacking mechanism as the height adjuster 39.

Figure 2:
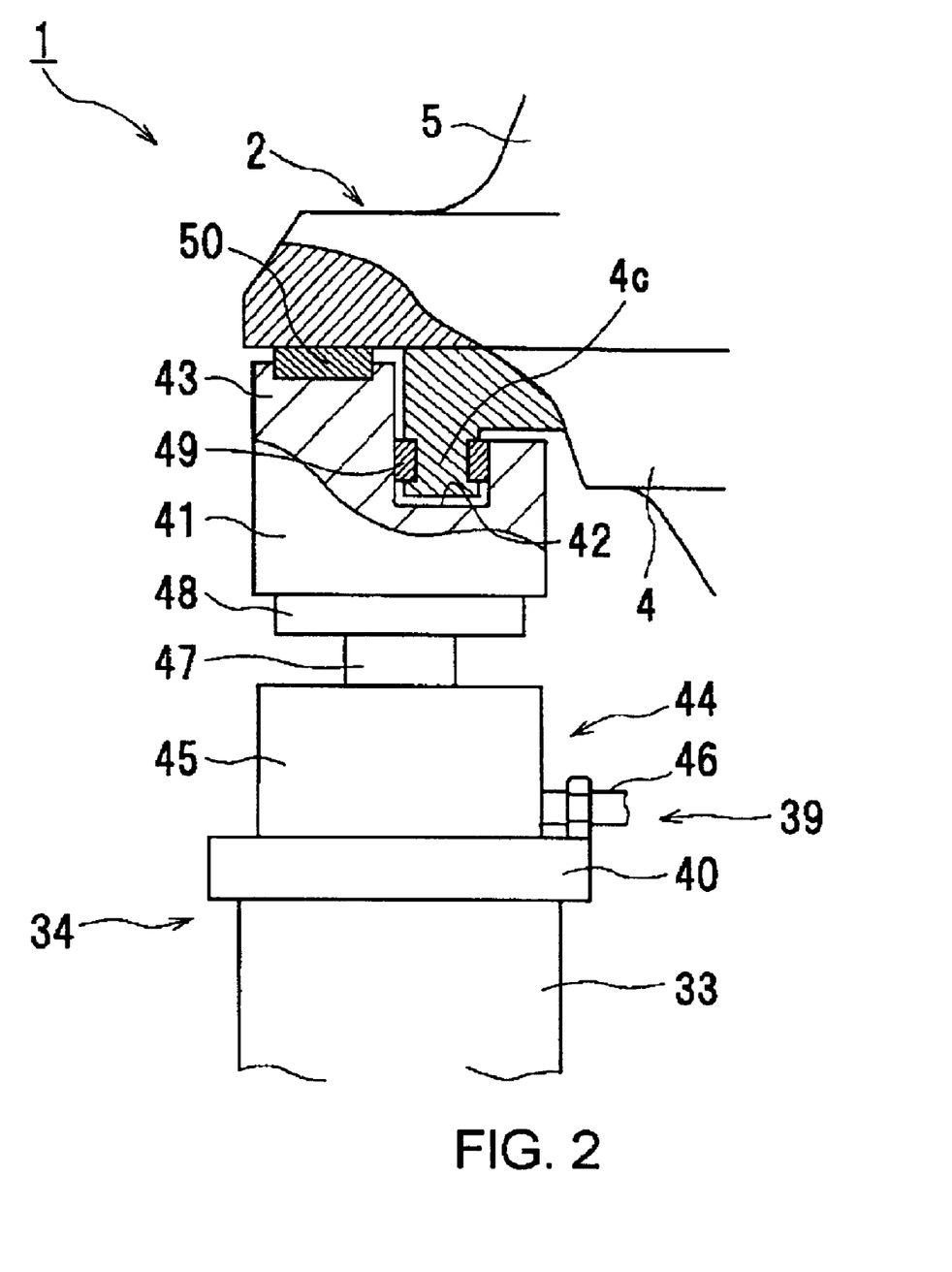
FIG. 2 is an enlarged sectional view of a casing supporting portion shown in FIG. 1.

FIG. 2 shows an enlarged constitution example of a supporting member 41 and a jacking mechanism 44 as a height adjuster at the casing support portion. As shown in FIG. 2, the supporting member 41 is composed of a block made of steel substantially in a shape of a parallelepiped, having a fitting groove 42 for receiving the casing lower half portion 4 at one side of upper face of the supporting member 41 and a receive portion 43 having a plane capable of receiving a total of the casing (actually, the casing upper half portion 5) after having been assembled by constituting an upper face on other side of the supporting member 41 as a constant wide flat face. A lower face of the supporting member 41 is supported by the jacking mechanism 44. Each jacking mechanism 44 is constructed by assembling a power converting mechanism of a hydraulic pressure type, a screw type or the like at the inside of a housing 45 in a shape of, for example, a parallelepiped, projected with a hydraulic pipe, a screw portion, or the like, which is designated as reference number 46, for operation, at a side face of the housing 45, and provided with a vertical lifting stay 47 and a support plate 48 on a side of an upper face of the housing 45.

The housing 45 is mounted above the flange portion 40 at an upper end of the stay 33 and the supporting member 41 in a block-like shape is mounted to the support plate 48. FIG. 2 shows a state as one example in which the projected portion 4c for supporting of the casing lower half portion 4 projected downwardly at an end portion of the casing lower half portion 4 is inserted into the fitting groove 42 of the supporting member 41 and axial keys 49 are inserted between two face walls of the filling groove 42 along a rotor shaft direction and the projected portion 4c for supporting thereby supports the projected portion 4c from two faces in the rotor shaft direction. While this figure shows a state in which after assembling the casing 2, an end portion of the casing upper half portion 5 fastened to the casing lower half portion 4 by bolts is mounted above the receive portion 43 of the upper face of the supporting member via a running key 50. FIG. 2 shows a state in transportation after assembling the casing, although a detailed description will be given in an assembling procedure, mentioned later.

Figure 3:
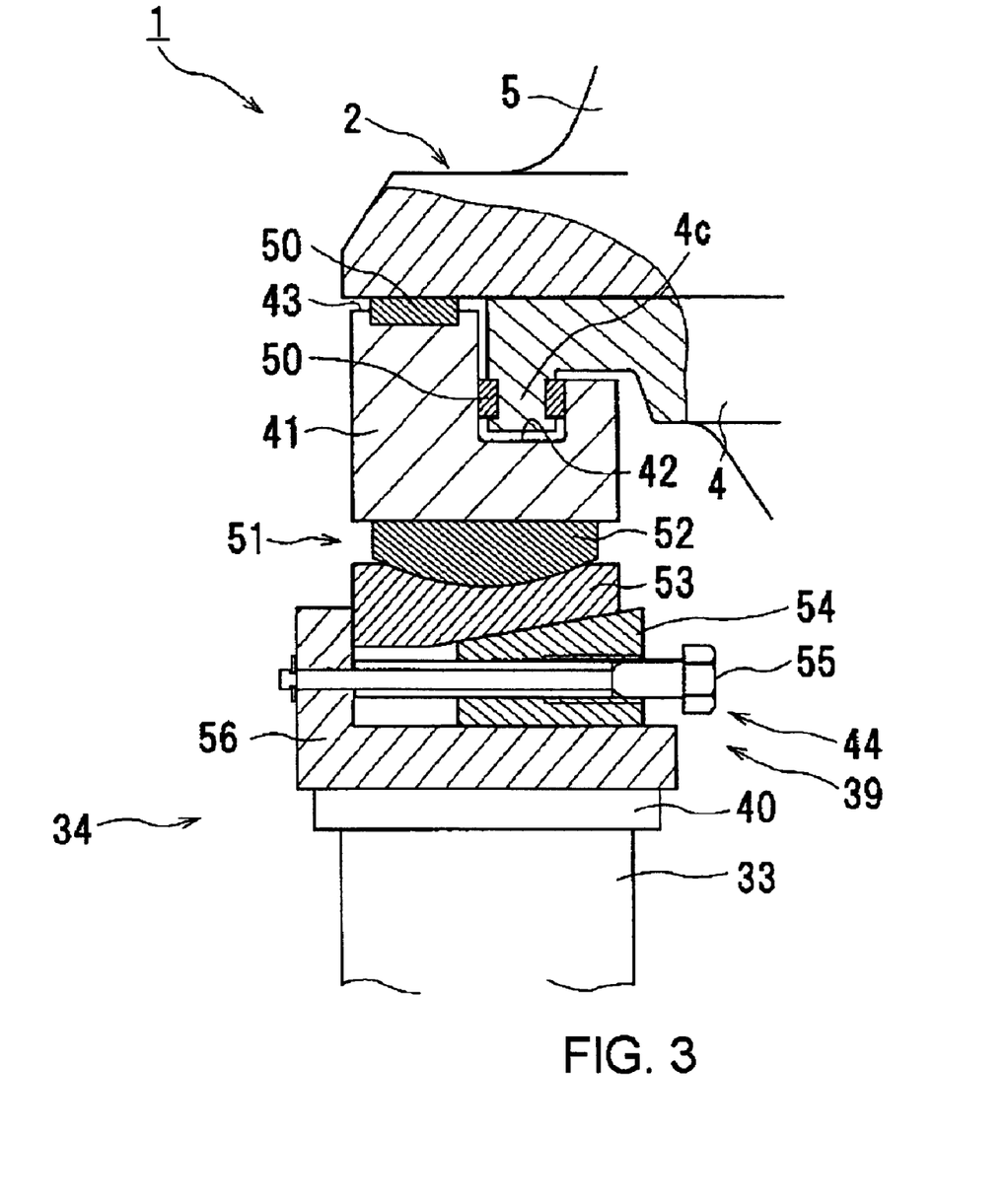
FIG. 3 is a sectional view showing a modified example of FIG. 2.

FIG. 3 shows an enlarged other constituting example of the supporting member 41 and the jacking mechanism 44 of the casing supporting portion 34 in this embodiment. Although this constitution example is substantially and basically similar to the constitution example shown in FIG. 2, a swiveling mechanism 51 is added and the jacking mechanism 44 is deformed in correspondence with the swiveling mechanism 51.

That is, the swiveling mechanism 51 is provided with an upper swiveling member 52 having a curved face bulged to a lower side, such as a spherical face, for supporting a lower end of the supporting member 41, and a lower swiveling member 53 having a curved face in a recessed shape at an upper face of the upper swiveling member 52 engaged with a curved face bulged to the lower side of the upper swiveling member 52, and the lower swiveling member has an inclined face at a lower face. And the two members 52 and 53 form an adjustable sliding contact face. Further, the jacking mechanism 44 is provided with a slide key 54 having an engaging slope for engaging with the inclined face of the lower swiveling member 53. Further, there are provided a bolt-type operating member 55 for moving the slide key 54 and a frame member 56 for holding the bolt-type operating member 55. Further, mechanism of this example enables to lift and lower the upper swiveling member 52 via the lower swiveling member 53 to thereby adjust the height by horizontally moving the slide key 54 according to rotating the bolt-type operating member 55. This state shown in FIG. 3 is also the state in transportation after assembling the casing similar to the example shown in FIG. 2.

In this way, the turbine frame 31 for integrally assembling and transporting according to this embodiment is composed of four casing supporting portions 34, two of the rotor supporting portions 37 and stays, beams, ribs and the like for reinforcement. And the casing supporting portion 34 is provided with the fitting groove 42 for receiving the casing lower half portion 4 and the receive portion 43 for receiving the casing 2 after assembling the casing upper half portion 5.

Figure 4:
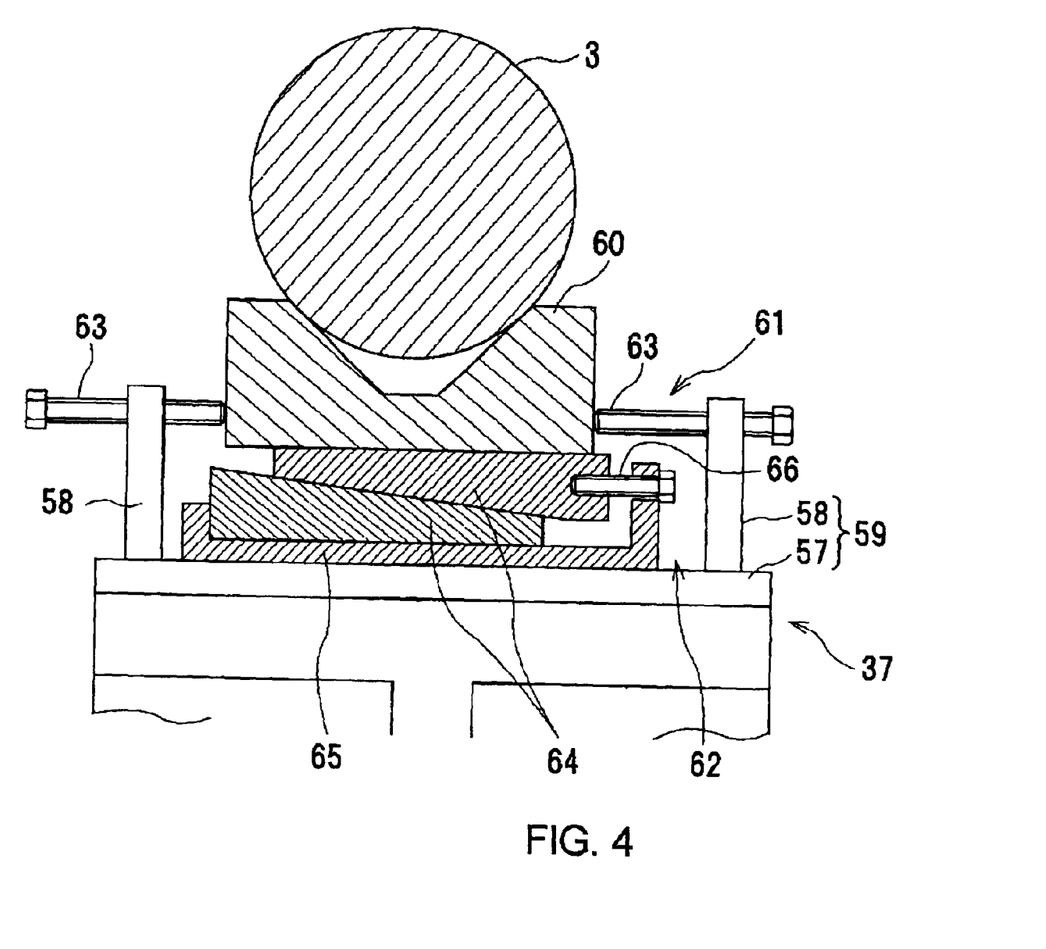
FIG. 4 is an enlarged sectional view showing a rotor supporting portion of the turbine assembling and transporting frame according to an embodiment of the invention.

FIG. 4 shows an enlarged constitution of the rotor supporting portion 37. The rotor supporting portion 37 is constructed to be capable of directly supporting the rotor 3 and is arranged at a position in correspondence with a bearing. That is, a supporting frame member 59 having a base plate 57 and support walls 58 rising from positions at two ends of an upper face of the base plate 57 is mounted on section steel constituting the rotor supporting portion 37, and the support frame member 59 is further provided with a V block 60 which supports the rotor instead of the bearings, roughly in a cross-sectional shape of a character V, for temporarily receiving the rotor 3, a push bolt mechanism 61 for adjusting a position of the V block 60 in the left and right direction and a jacking mechanism 62 for adjusting a height of the supporting frame member 59. The push bolt mechanism 61 has a constitution for supporting bolts 63 arranged on left and right sides of the V block 60 by the support walls 58 rising from the base plate 57 and the jacking mechanism 62 is provided with a constitution supporting, for example, two stages of wedge-shaped jacking plates 64 arranged on a lower side of the V block 60 by a holder 65 and provided with an adjusting screw 66 at a side portion of the holder 65. Thereby, a position of the V block 60 and, therefore, a position of the rotor 3 can be adjusted in an up and down direction and a left and right direction.

Next, we explain a method of assembling a turbine according to this embodiment. In this embodiment, firstly, the casing lower half portion 4 is mounted on the supporting members 41 of the casing supporting portions 34 shown in FIG. 1. In this case, similar to the conventional example as mentioned above, the projected portions 4c are inserted into and supported by the fitting grooves 42 of a total of four pieces of the supporting members 41 at two portions constituting symmetrical positions with respect to center lines at respective end portions of the casing lower half portion 4 in the axial direction in a state of respectively mounting assembly keys (refer to reference number 20 in FIG. 9). However, in this embodiment, it is not necessary to adjust a thickness of the assembly key or a shim. That is, since there is provided the jacking mechanism 44 constituting the height adjusting mechanism 39 for adjusting the height at the portion of supporting the casing 2 and therefore, the horizontal level of the casing 2 can be adjusted thereby, and load applied on the casing supporting portions 34 can be made uniform. Conventionally, it is necessary to operate a crane to lift the casing to extract the shim for constituting a necessary thickness by grinding the thickness of the shim or adding a thin shim, and afterward to lift down the casing or the like. However, in this embodiment, such operations can easily be carried out without using the crane or the like, by providing the jacking mechanism 44 having the height adjustor 39 of the casing.

Additionally, according to this embodiment, since the swiveling mechanism 51 having a spherical face in the casing supporting portion 34 is provided, a swiveling function by spherical face contact can be achieved, and even when the turbine frame 31 constituting a steel frame structure is fabricated to be twisted or the casing supporting portion 34 is twisted, the casing can always be supported vertically by the swiveling mechanism 51 and installation of the casing 2 can be carried out without twisting the casing 2 per se.

In the case of another constitution example shown in FIG. 3, twisting can be resolved only by the swiveling mechanism 51 having a spherical surface. Further, by using the jacking mechanism 44 for adjusting the height, even when heights of four pieces of the casing supporting portions 34 of the frame 31 are not uniform, the heights can be adjusted. That is, the casing can be installed in a pertinent state without concern for a difference in the heights of the casing supporting portions 34 of the turbine frame 31 or a twist of the casing supporting portions 34.

After carrying out installation by adjusting the horizontal level of the casing 2 and adjusting a relative positional relationship such that uniform load is applied to each of the receive portions 43 as described above, the installed casing lower half portion 4 is assembled with parts on the lower half side in stationary parts of the nozzle 6 or the like divided in two in the up and down direction. Further, rotor is mounted and clearances are measured, clearance values are made proper values by adjusting the stationary parts and the rotor position and parts on the upper half portion side are assembled. The rotor 3 is temporarily mounted before the lower half parts are installed on the V blocks 60 constituting the rotor supporting portions 37, and under this state, a position thereof relative to the casing 2 is confirmed. Further, the position of the rotor 3 relative to the casing 2 can be confirmed by measuring clearances between the casing 2 and the rotor 3 in the left and right direction and the lower direction at both ends of the casing 2 in the rotor shaft direction. After confirming the position, the rotor 3 is temporarily drawn out from the casing 2. Further, under this state, the stationary parts on the lower half portion side are integrated to the casing lower half portion 4, thereafter, a piano wire (not illustrated) assuming the rotor 3 is stretched and there is produced a center constituting a reference relative to the piano wire. In centering the reference by the piano wire, vicinities of faces for attaching packing casings at both ends of the casing 2 is used (refer to FIG. 5 and FIG. 6, to be mentioned later).

Thereafter, the detached rotor 3 is assembled again to the casing 2, necessary adjustment of the stationary portion is carried out by confirming clearances relative to the stationary portion, the upper half portion side parts are assembled and thereafter, the casing upper half portion 5 is assembled. Further, in order to prevent a deviation between the turbine 1 and the frame 31 in a direction of a horizontal face orthogonal to the rotor shaft core in transportation, the frame 31 is also provided with a function of being fixed in a direction orthogonal to the rotor shaft by fitting a part referred to as center key attached to an end portion of the casing in the lower direction, although not illustrated, to a key groove provided at the rotor supporting portion 37. Finally, the casing upper half portion 5 is assembled to the casing lower half portion 4, assembling is finished by fastening the half portions by bolts and thus the turbine is completed. At this occasion, with regard to the casing 2, for supporting the casing lower half portion 4 by the casing upper half portion 5, whereas a running key 50 is inserted between the casing upper half portion 5 and the receive portion 43 of the casing supporting portion 34, the previously inserted assembly key is detached and the casing 2 is supported by the running key 50. In this way, the casing 1 constituting the stationary portion and the rotor 3 constituting the rotary portion are assembled by respective supporting structures. And in shipment, like a conventional method, the casing lower half portion 4 is bound tight with the frame 31 and a hold down bolt (not shown) stood from the frame 31, and thus up-and-down movement is stopped.

Further, also according to the embodiment, similar to the conventional example, bearing standards are delivered separately from the casing in consideration of fixedly installing the bearing standards to a concrete foundation or the like at a site of installing the turbine such as a power station or the like.

Figure 5:
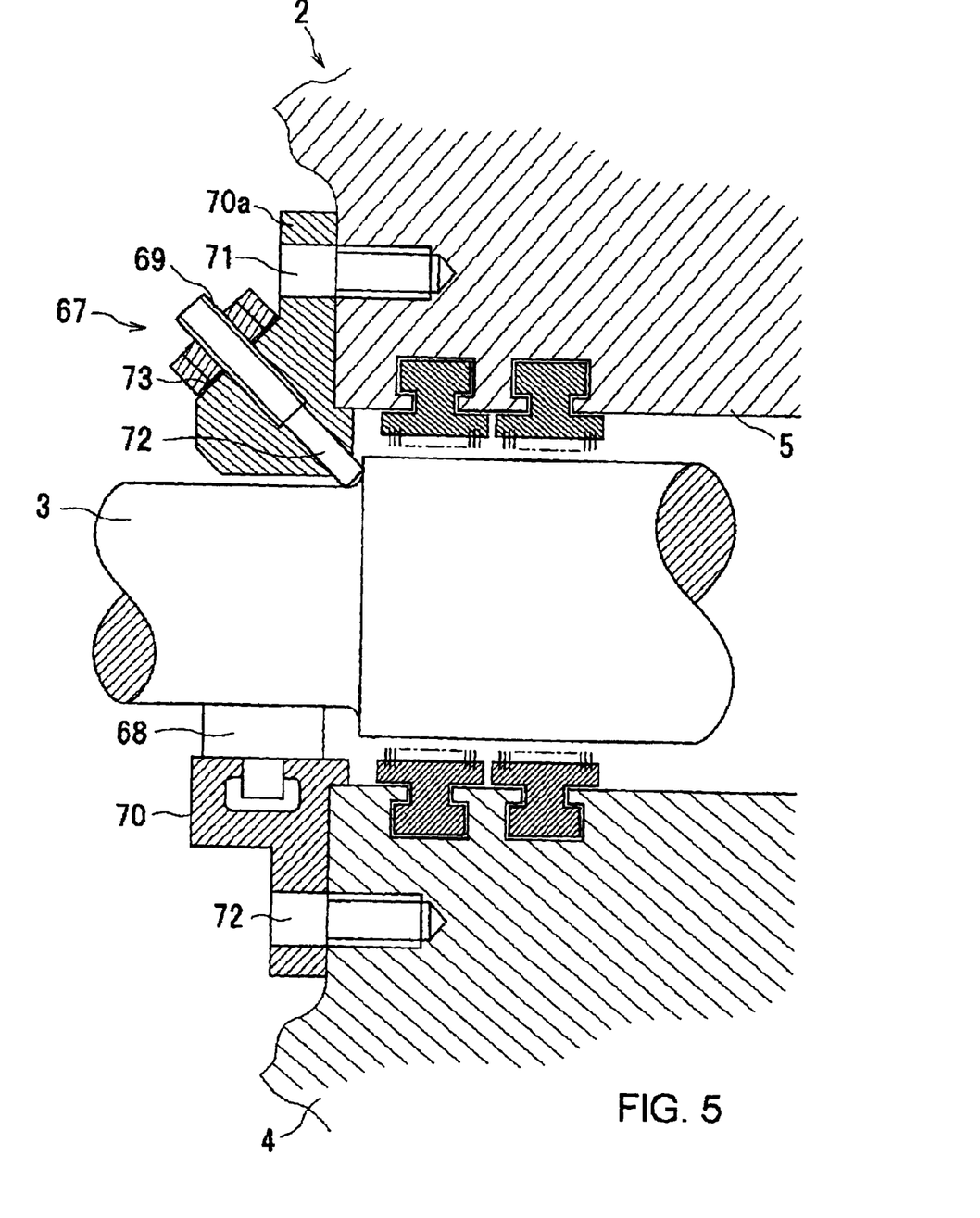
FIG. 5 is an enlarged sectional view showing temporarily receiving a rotor for explaining assembling and transporting methods according to an embodiment of the invention.
Figure 6:
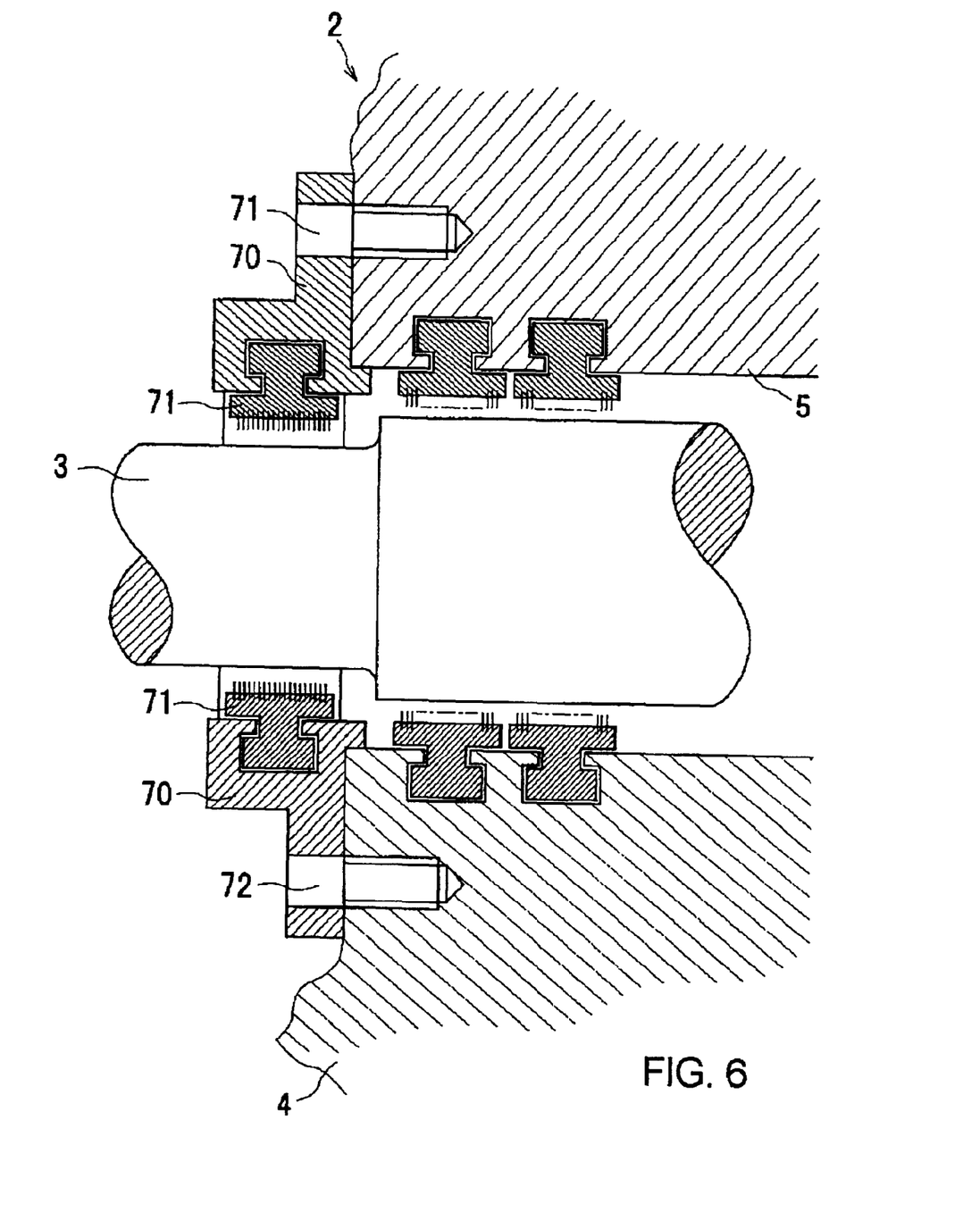
FIG. 6 is an enlarged sectional view showing a packing casing portion in correspondence with FIG. 5.

FIG. 5 is a sectional view showing fixing mechanism 67, such as a clamping mechanism or a clamping fixture, for fixing the rotor 3 to the casing 2 in a state of detaching the bearing and FIG. 6 is a sectional view showing a location of installing the fixing means 67 shown in FIG. 5. That is, according to the embodiment, the rotor 3 is fixed to the casing 2 by using a first and a second rotor receive 68 and 69 for temporarily receiving as the fixing means 67.

The first rotor receive 68 is for assembling the rotor receive 68 for temporarily receiving the rotor 3 to a packing casing 70 provided at an end portion of the casing 2 to thereby fix the rotor in transportation. That is, as shown by FIG. 6, the packing casing 70 is inherently a member for holding a gland packing 71 and in place of the gland packing, as shown by FIG. 5, the rotor receive 68 having a shape substantially the same as that of the gland packing 71 is assembled to thereby support the rotor 3 from a diameter direction.

Further, the second rotor receive 69 is for preventing movement of the rotor 3 per se in the axial direction. For that purpose, the second rotor receive 69 is constituted by a bolt inclined to the axial direction of the rotor 3 by a constant angle to thereby provide a function of fixing the rotor 3. Under the state, the whole of the casing is hung and also the rotor 3 is hung while maintaining a positional relationship relative to the stationary portion.

Further, the first rotor receive 68 is constructed by a socket and spigot structure matched with an inner diameter of the casing 2 and an inner diameter thereof constitutes a diameter in correspondence with a diameter of the rotor at the portion. The packing casing 70 is constructed by a socket and spigot structure matched with an inner diameter of the casing, and a position of the packing casing 70 is fixed by the spigot diameter and fixedly fastened thereto by a packing casing attaching bolt 72. The rotor receive 68 is brought into contact with the inner diameter portion of the packing casing 70 in a substantially complete coincidence state and the rotor load is received by the casing 2 via the rotor receive 68 and the packing casing 70.

However, center of the inner diameter of the first rotor receive 68 is deviated in the lower direction in consideration of a difference in bending of the rotor 3 between a position of the bearing for actually supporting the rotor and a position of the packing casing 70. Because the rotor 3 is inherently supported by the bearing, the position of the packing casing 70 is more or less separated from the position of the bearing and at the portion of the packing casing 70, different from a supporting portion in the bearing, there is more or less bending by gravitational force. By previously taking an amount of the bending into account, the rotor 3 is set to a condition similar to that of a state of being supported by the bearing.

Further, the packing casing 70 is machined by being matched to the inner diameter of the casing 2 and, therefore, an inner diameter portion thereof can be machined by being strictly matched with the center of the casing 2 in the left and the right direction. In this way, a state of mounting the rotor 3 on the rotor receive 68, constitutes almost same condition as that in the case of receiving the rotor 3 by the bearing and also, in a positional relationship between the casing 2 and the rotor 3, a centered situation is brought about.

The rotor receive 68 is assembled to the packing casing 70 provided at the end portion of the casing 2. The rotor receive 68 is a part in a shape of a circular arc and is assembled by being slid in a peripheral direction from a horizontal face constituting a face of dividing the packing casing 70 in the up and down direction. At this occasion, the rotor 3 needs to maintain at an assembled position at which the rotor 3 is received by the bearing and therefore, the rotor receive 68 is machined in an accurate dimension provided from an assembled state.

In inserting by sliding the rotor receive 68, the rotor 3 is slightly pushed up by a hydraulic jack or the like and a clearance between the rotor 3 and the packing casing 70 is slightly widened. When the rotor receive 68 is contained in the lower portion, the hydraulic jack or the like is loosened and the rotor 3 is received by the rotor receive 68. Thereby, the rotor 3 is supported at a same position as that in receiving the rotor 3 by the bearing.

The bolt 72 constituting the second rotor receive 69 is brought into contact with a portion of a stepped difference between different diameters of the rotor 3. Further, the packing casing 70*a* in this case is not constructed by a constitution having a regular shape. Because the packing casing 70*a* is provided with a function of fixing the rotor 3 by forming a screw hole 73 in a shape of an inclined face at a portion thereof in order to prevent movement of the rotor receive 68 and prevent movement of the rotor 3 per se in the axial direction. Thereby, the position of the rotor 3 is fixed relative to the casing 2 and other stationary portion and the rotor 3 is assembled. When the whole of the casing 2 is hung under the state, the rotor 3 is also hung while maintaining the positional relationship relative to the stationary portion. In this way, in delivering, the delivering is carried out by fixing the rotor 3 to the attaching portion of the packing casing 70 and fixing the center key portion and pipes of the casing 2 to the frame 31. After having been installed to a power station site, as shown by FIG. 6, the packing casing 70*a* is switched by the regular packing casing 70.

As explained above, according to this embodiment, whereas the frame 31 is constituted by the steel frame structure having a large-sized structure and, therefore, machining is difficult and the supporting portion of the casing 2 is not necessarily machined surface in the same level, the horizontal level of the casing 2 can effectively be adjusted by a jack or the like. Further, the casing supporting portion 34 is provided with the function of a swivel having a spherical face and, therefore, even when, for example, the frame 31 of the steel frame structure is fabricated while being twisted or the supporting portion of the casing 2 is twisted, the casing 2 is always supported vertically by the swiveling mechanism 51 and installation can be carried out without twisting the casing 2. Therefore, according to this embodiment, similar to the conventional case of assembling the turbine on the base level block, the turbine can be assembled on the frame 31 with maintaining, or adequately keeping of the alignment of the turbine components. In addition, time and labor for shifting an assembled product can be reduced, and, further, a space for temporarily placing a frame for transportation is dispensed with and saving of space is achieved.

As described above in details, according to this invention, similar to the conventional case of assembling a turbine on base level block, a turbine can be assembled above a frame for transportation to thereby achieve an excellent effect in which not only time and labor for shifting an assembled product but also a space of temporarily placing a frame for transportation can be saved and the like.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative of, but not limiting to, the scope of the invention, which is set forth in the following claims. Thus, the present invention may be embodied in various ways within the scope of the spirit of the invention.

What is claimed is:

1. A turbine frame comprising:
    a supporting portion configured to support turbine components during assembly of the turbine; wherein
        the supporting portion includes a casing supporting portion configured to support a turbine casing, a rotor supporting portion configured to support a turbine rotor, and position adjusters which adjust the position of the supporting portion, and wherein
        the position adjusters are configured to control alignment of the turbine components during assembly of the turbine, and wherein
        the casing supporting portion includes a casing height adjuster which adjusts the height of the casing supporting portion, and the rotor supporting portion includes a rotor position adjuster which adjusts the position of the rotor supporting portion, and wherein
        the casing height adjuster and the rotor position adjuster serve as the position adjusters.

2. The turbine frame of claim 1, wherein the turbine frame is adapted to transport the assembled turbine.

3. The turbine frame of claim 2, wherein the position adjusters are configured to control the alignment of the turbine components during transportation of the turbine.

4. The turbine frame of claim 1, wherein the turbine frame is adapted to transport the assembled turbine and wherein the casing height adjuster and the rotor position adjuster are configured to control the alignment of the turbine components during transportation of the turbine.

5. The turbine frame of claim 1, wherein the casing supporting portion further includes a swiveling mechanism.

6. The turbine frame of claim 1, further comprising a holding fixture which holds the rotor at a packing casing position provided at the casing.

7. The turbine frame of claim 1, wherein the casing supporting portion supports the turbine casing in the vicinity of end positions of the turbine rotor and in an axial direction symmetrically arranged relative to the rotor.

8. The turbine frame in claim 7, wherein the turbine frame is adapted to transport the assembled turbine.

9. The turbine frame of claim 8, wherein the position adjusters are configured to control the alignment of the turbine components during transportation of the turbine.

10. A method of assembling turbine components of a turbine using a turbine frame comprising:
    arranging a casing of the turbine on a first supporting portion provided in the turbine frame;
    arranging a rotor of the turbine on a second supporting portion provided in the turbine frame;
    adjusting the height of the casing by adjusting the first supporting portion;

adjusting the position of the rotor by adjusting the second supporting portion in at least one of the horizontal and vertical directions; and assembling the turbine components while maintaining the alignment of the turbine components.

11. A method of assembling turbine components of a turbine using a turbine frame comprising:

arranging a casing of the turbine on a first supporting portion provided in the turbine frame;

arranging a rotor of the turbine on a second supporting portion provided in the turbine frame;

adjusting the height of the casing by adjusting the first supporting portion;

adjusting the position of the rotor by adjusting the second supporting portion in at least one of the horizontal and vertical directions;

assembling the turbine components while maintaining the alignment of the turbine components;

securing the assembled turbine to the turbine frame; and transporting the turbine frame with the turbine secured to the turbine frame.

12. A turbine frame comprising:

a supporting portion configured to directly support turbine components during assembly of the turbine, wherein the supporting portion includes a rotor supporting portion configured to support a turbine rotor, and wherein the rotor supporting portion includes a rotor position adjuster which adjusts the position of the rotor supporting portion so as to control alignment of the turbine components during assembly of the turbine.

* * * * *